US010102700B2

(12) United States Patent
Wendling et al.

(10) Patent No.: US 10,102,700 B2
(45) Date of Patent: Oct. 16, 2018

(54) SYSTEM AND METHOD FOR ENTRY ACCESS CONTROL USING RADIO FREQUENCY COMMUNICATION

(71) Applicants: Jean Hugues Wendling, Denver, CO (US); Michael T Conlin, Superior, CO (US); Daniel William Field, Broomfield, CO (US); Michael William Malone, Boulder, CO (US); Taylor Schmidt, Littleton, CO (US)

(72) Inventors: Jean Hugues Wendling, Denver, CO (US); Michael T Conlin, Superior, CO (US); Daniel William Field, Broomfield, CO (US); Michael William Malone, Boulder, CO (US); Taylor Schmidt, Littleton, CO (US)

( * ) Notice: Subject to any disclaimer, the term of this patent is extended or adjusted under 35 U.S.C. 154(b) by 0 days.

(21) Appl. No.: 15/416,054

(22) Filed: Jan. 26, 2017

(65) Prior Publication Data

US 2018/0211462 A1 Jul. 26, 2018

(51) Int. Cl.
*B60R 25/24* (2013.01)
*G07C 9/00* (2006.01)

(52) U.S. Cl.
CPC ..... *G07C 9/00309* (2013.01); *G07C 9/00103* (2013.01); *G07C 2009/00769* (2013.01)

(58) Field of Classification Search
CPC .................................................. G07C 9/00309
See application file for complete search history.

(56) References Cited

U.S. PATENT DOCUMENTS

| | | | | |
|---|---|---|---|---|
| 6,721,900 | B1 * | 4/2004 | Lenner | G05B 19/0423 714/4.4 |
| 2014/0143860 | A1 * | 5/2014 | Druckman | G06F 21/36 726/19 |
| 2014/0282937 | A1 * | 9/2014 | Farber | H04L 63/08 726/6 |
| 2014/0373111 | A1 * | 12/2014 | Moss | H04W 12/08 726/5 |
| 2015/0028996 | A1 * | 1/2015 | Agrafioti | G06F 21/40 340/5.82 |
| 2015/0187151 | A1 * | 7/2015 | Lagerstedt | G07C 9/00111 340/5.61 |
| 2015/0222623 | A1 * | 8/2015 | Lowe | H04L 63/062 726/6 |

* cited by examiner

*Primary Examiner* — Joseph Feild
*Assistant Examiner* — Pameshanand Mahase
(74) *Attorney, Agent, or Firm* — Daniel M. Cohn; Howard M. Cohn; Mike Kahn

(57) ABSTRACT

Disclosed embodiments provide techniques for entry access synchronization. A lock interface module is installed at a premises and is in communication with one or more electronic locks. The lock interface module is in electronic communication with an access management system. Changes in access permissions made from the access management system are quickly propagated to the electronic locks by the lock interface module.

14 Claims, 9 Drawing Sheets

SYSTEM AND METHOD FOR ENTRY ACCESS CONTROL USING RADIO FREQUENCY COMMUNICATION

TECHNICAL FIELD

The present invention relates generally to access control for building entrances, and more particularly, to entry access control using radio frequency communication.

BACKGROUND

Legacy access control systems have typically made use of a credential carried by the end user, a reader mounted at or near the access point to be secured, a server running access control software (the head end) and one or more door controllers mounted at or near the door to be controlled. In the case that connectivity between the door controller and the head end server is lost, these controllers contain a copy of the access database (credential list) and are capable of controlling the door or doors to which they are assigned.

Another approach for legacy access control systems makes use of RFID enabled battery powered locks mounted at each door to be secured. In the case of such a lock, an onboard database contains a credential list indicating who is allowed access, and at what times. Further, these lock databases often contain other data and information that we would like to synchronize with the head end access server. Examples of such information include things like access audit trails and the state of the battery charge in the lock. Since these locks often have no connection to the host they are considered to be "offline" locks. For an offline lock, a major challenge for the system designer is maintaining synchronization between the lock database (credential list) and the credential list maintained by the head end server. Additionally, when a particular lock has accumulated information that the system administrator should know, there can be delays in getting this information back to the head end server (access management system) so that the system administrator has visibility to it. Therefore, it is desirable to have improvements in entry access control to address the aforementioned issues.

SUMMARY

In one embodiment, there is provided an access control system comprising: a lock interface module configured and disposed to receive electronic data from an access management computer; and an electronically activated lock adapted to receive short-range communication from the lock interface module; a credential reader configured and disposed to read a credential from a user; wherein the lock interface module is configured and disposed to transmit a credential list to the electronically activated lock.

In another embodiment, there is provided an access control system comprising: a first lock interface module configured and disposed to receive electronic data from an access management computer; a second lock interface module configured and disposed to receive electronic data from the access management computer; and an electronically activated lock adapted to receive short-range communication from the first lock interface module and the second lock interface module; a credential reader configured and disposed to read a credential from a user; wherein the first lock interface module is configured and disposed to transmit a first set of updated credential information to the electronically activated lock, and wherein the second lock interface module is configured and disposed to transmit a second set of updated credential information to the electronically activated lock such that credential information for the user can be added when the first set of credential information and second set of credential information is received by the electronically activated lock.

In another embodiment, there is provided a method for access control, comprising: receiving a credential list into a first lock interface module; transmitting the credential list to an associated electronically activated lock from the first lock interface module; receiving a credential from an associated credential reader configured and disposed to read a credential from a user; and preventing access of the user if the credential is not in the credential list.

BRIEF DESCRIPTION OF THE DRAWINGS

The structure, operation, and advantages of the present invention will become further apparent upon consideration of the following description taken in conjunction with the accompanying figures (FIGs.). The figures are intended to be illustrative, not limiting.

Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity. Furthermore, for clarity, some reference numbers may be omitted in certain drawings.

DETAILED DESCRIPTION

While the aforementioned systems may provide a crude form of data synchronization between the lock and head end databases, there are a number of real world limitations that make the system impractical to be relied upon for timely updates. One important example that illustrates this point is the feature known as "blacklisting". Blacklisting occurs when an individual end user of the system has their access privileges revoked. Now consider the case of a remote door that might only be accessed once a week or once a month. Since this system relies on viral transmission of the blacklisted individual it could take up to a week or month for the blacklisted individual to be removed from the remote lock database. This means that the blacklisted individual might have access to this remote door for up to a month resulting in an undesirable unsecure situation.

Disclosed embodiments provide techniques for entry access synchronization. A lock interface module is installed at a premises and in communication with one or more electronic locks. The lock interface module is in electronic communication with an access management system. Changes in access permissions made from the access management system are quickly propagated to the electronic locks by the lock interface module. This improves security for the premises, since persons who have become deauthorized do not have a time window to gain access to the premises.

Figure 1:
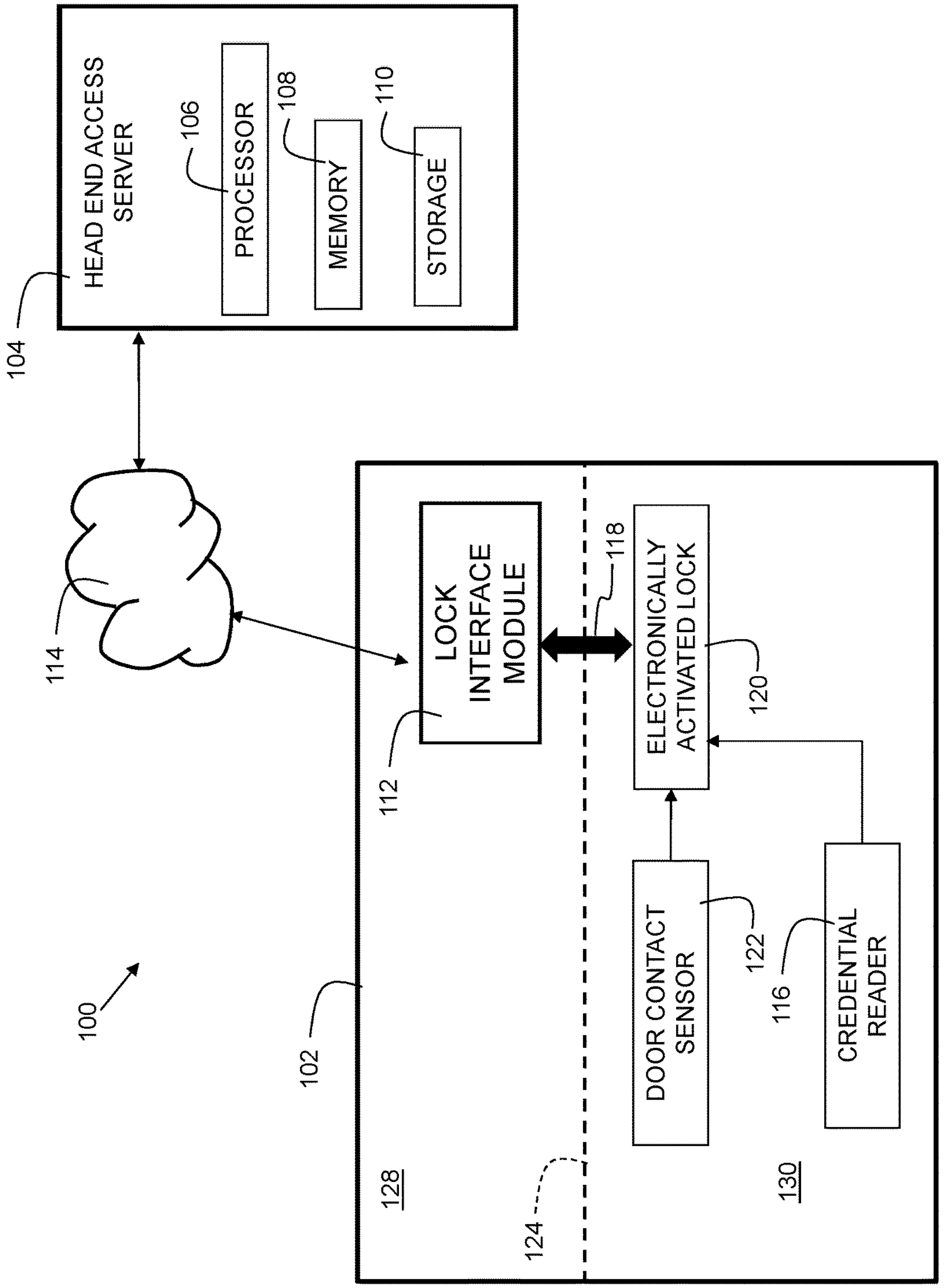
FIG. 1 is a block diagram of a system in accordance with embodiments of the present invention.

FIG. 1 is a block diagram of a system 100 in accordance with embodiments of the present invention. System 100 includes a head end access server 104. In embodiments, the head end access server 104 serves as an access control system. Server 104 may be used to administrate active users of a premises. Users of a premises, such as employees at a workplace, or students at a school, may have credential information entered into the storage 110 of server 104. In embodiments, the storage 110 may include magnetic storage such as a hard disk drive (HDD), solid state storage, such as a solid state drive (SSD), or other suitable storage technology. Server 104 comprises a processor 106, and memory 108 coupled to the processor. The memory 108 may be a non-transitory computer readable medium. Memory 108 may include RAM, ROM, flash, EEPROM, or other suitable storage technology. The memory 108 contains instructions, that when executed by processor 106, enable communication with lock interface module 112 via network 114. In embodiments, network 114 may include the Internet. The lock interface module 112 is installed within premises 102. Premises 102 may include a secure side 128, and an unsecure side 130, bounded by wall 124. On the unsecure side 130, a credential reader 116 and door contact sensor 122 are electronically interfaced to electronically activated lock 120. When a user wishes to pass from the unsecure side 130 to the secure side 128, the user may place a credential (e.g. an RFID enabled card) in proximity to the credential reader 116. The electronically activated lock 120 checks an internally stored credential list, and unlocks the entrance if the user's credential is found in the list. Additionally, a user may have a time window associated with his/her credential. In some cases, a user may only be granted entry within a certain time range and/or certain days of the week. In such cases, if the user's credential is found in the list, but the current date/time is not within an allowable time range, then the user is denied access. For example, if a user is allowed access only on weekdays between 6:00 AM and 6:00 PM, then an attempt to access outside of those times results in a denial of access. A door contact sensor 122 can be used to confirm that the entrance (e.g. door) is opened, allowing the user to enter, and then confirm that the door closes. Once the door closes, as detected by door contact sensor 122, the lock 120 is activated again, and the entrance is locked.

In practice, the set of users allowed access to a premises can change, and sometimes can change very quickly. For example, an employee of a company can be terminated immediately. In such a case, the user may be removed from the credential list maintained by the head end access server 104 by an administrator. An updated credential list is immediately sent to the lock interface module 112 via network 114. The lock interface module 112 transmits the updated credential list to the electronically activated lock 120 via a short range wireless communications channel 118. In practice, the head end access server can be located many miles from the premises 102, as long as it is reachable via network 114. In prior art systems, there can be a delay in updating the credential list of the locks, creating a security vulnerability because there is a time window between update of the server and update of the credential list in the electronically activated lock in which an unauthorized person can open an electronically activated lock. With embodiments of the present invention, the credential list is updated in real time, eliminating the aforementioned security vulnerability.

Figure 2:
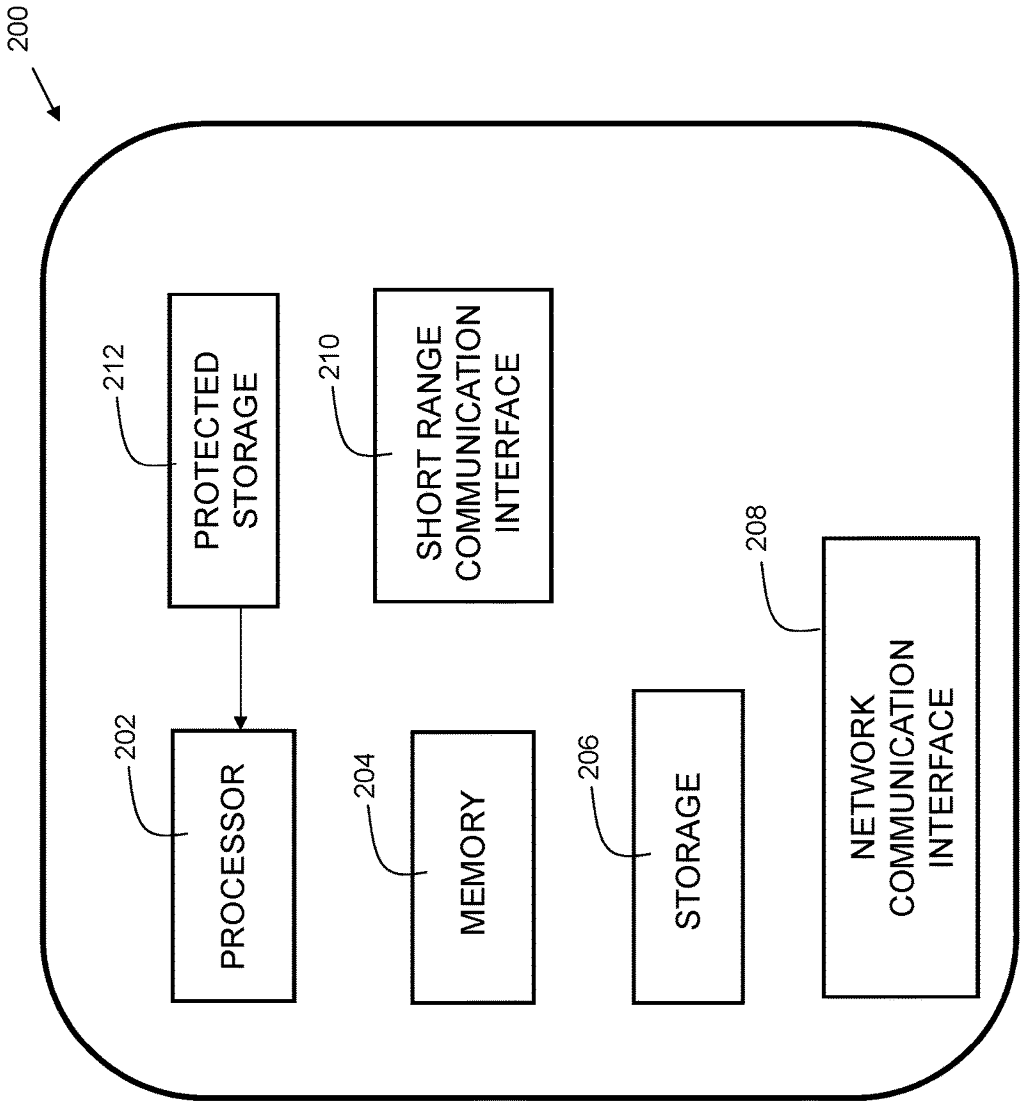
FIG. 2 is a block diagram of a lock interface module in accordance with embodiments of the present invention.

FIG. 2 is a block diagram of a lock interface module in accordance with embodiments of the present invention. Lock interface module 200 includes a processor 202, and a memory 204 coupled to the processor. The memory 204 may be a non-transitory computer readable medium such as RAM, ROM, flash, or the like. The memory 204 contains instructions, that when executed by processor 202, implement embodiments of the present invention. Lock interface module 200 also comprises storage 206. Storage 206 may include RAM, Flash, a magnetic storage such as a hard disk drive (HDD), and/or a solid state disk drive (SDD). The storage 206 may be configured and disposed to store a credential list. The lock interface module 200 further includes a network communication interface 208. The network communication interface 208 may include a wired and/or wireless communication interface. An embodiment with a wired interface may utilize an Ethernet or Gigabit Ethernet interface. An embodiment with a wireless interface may utilize a WiFi interface, and/or a cellular network interface. The lock interface module 200 further includes a short range (e.g. less than 200 meters) communication interface 210. The short range communication interface 210 may include, but is not limited to, a Bluetooth™ interface, a Bluetooth Low Energy (BLE) interface, a Zigbee interface, and/or a WiFi interface.

In embodiments, the lock interface module 200 serves as a bridge between the server 104, and one or more electronically activated locks 120. The lock interface module 200 can communicate with the server 104 via the Internet using protocols such as TCP/IP, UDP, SSH, and/or other suitable protocols. The lock interface module 200 is configured to receive a credential list from the server 104, and transmit the credential list to an electronically activated lock via the short range communication interface. The short range communication interface may be selected in terms of frequency and power to communicate at a range of up to about 30 meters. This allows flexibility in the placement of electronically activated locks with respect to the position of the lock interface module. The electronically activated locks can use low power communication interfaces, thereby saving power and reducing operating costs.

In some embodiments, the lock interface module 200 may further include protected storage 212. Protected storage 212 may be a read-only memory such as a protected flash, ROM, or other memory that cannot be erased or changed. The read-only memory can be fuse-enabled memory. In such memory, unique identifiers such as serial numbers, device addresses and/or security certificates can be programmed into the protected storage 212 at the factory where the devices are manufactured. Then, an e-fuse is blown in the protected storage circuit to prevent write operations to the protected storage 212. In embodiments, the data in the protected storage may be on a separate data bus from the memory 204 and/or storage 206. The data within the protected storage 212 can be used for authentication with electronically activated locks and/or the head end access server 104.

Figure 3:
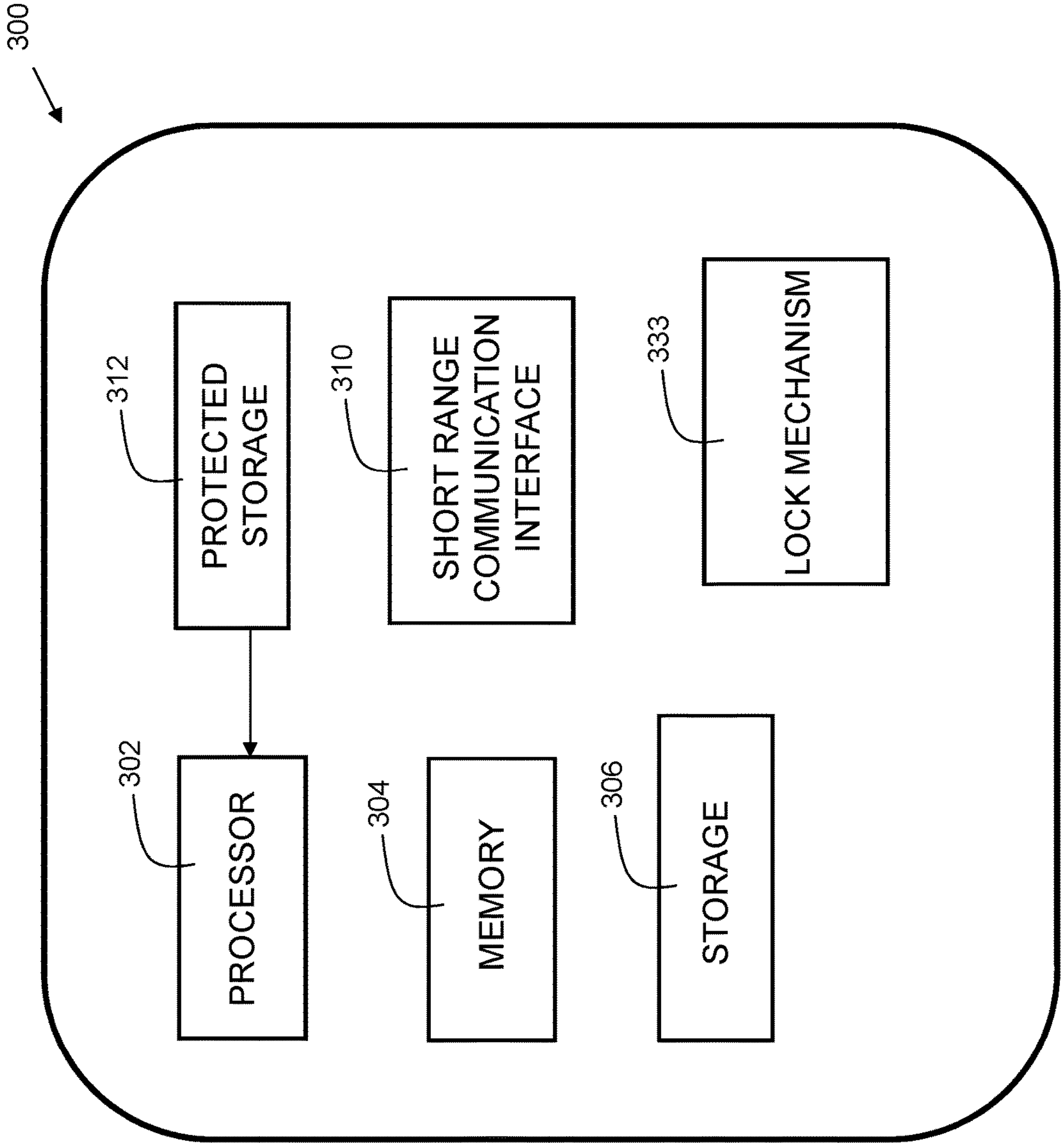
FIG. 3 is a block diagram of an electronically activated lock in accordance with embodiments of the present invention.

FIG. 3 is a block diagram of an electronically activated lock 300 in accordance with embodiments of the present invention. Electronically activated lock 300 includes a processor 302, and a memory 304 coupled to the processor. The memory 304 may be a non-transitory computer readable medium such as RAM, ROM, flash, or the like. The memory 304 contains instructions, that when executed by processor 302, implement embodiments of the present invention. Electronically activated lock 300 also comprises storage 306. Storage 306 may include RAM, flash, a magnetic storage such as a hard disk drive (HDD), and/or a solid state disk drive (SDD). The storage 306 may be configured and disposed to store a credential list. Electronically activated lock 300 further includes a lock mechanism 333. The lock mechanism may be an electromechanical lock, an electric strike, or a solenoid operated lock which may include a direct throw mortise bolt. Alternatively, the lock mechanism 333 may be a magnetic door lock.

In some embodiments, the electronically activated lock 300 may further include protected storage 312. Protected storage 312 may be a read-only memory such as a protected flash, ROM, or other memory that cannot be erased or changed. The read-only memory can be fuse-enabled memory. In such memory, unique identifiers such as serial numbers, device addresses and/or security certificates can be programmed into the protected storage 312 at the factory where the devices are produced. Then, an e-fuse is blown in the protected storage circuit to prevent write operations to the protected storage 312. In embodiments, the data in the protected storage may be on a separate data bus from the memory 304 and/or storage 306. The data within the protected storage 312 can be used for authentication with the lock interface module 112.

Electronically activated lock 300 further includes a short range communication interface 310. The short range communication interface 310 may include, but is not limited to, a Bluetooth™ interface, a Bluetooth Low Energy (BLE) interface, a Zigbee interface, and/or a WiFi interface. The wireless interface greatly simplifies and speeds up the installation process, since wires do not have to be directly connected between the lock interface module and the electronically activated lock.

In embodiments, the lock interface module periodically receives a credential list from the head end access server. The most recent credential list received is then periodically sent from the lock interface module to one or more electronically activated locks. In embodiments, each electronically activated lock compares the received credential list with the currently stored credential list in its storage 306. The processor 302 detects users in the current list that are not present in the new list. The processor then performs deletions, removing those users that no longer have access from the current list. Similarly, the processor 302 detects users in the new list that are not present in the current list. The processor then performs additions, adding the new users to the current list so they can have access. In this way, the electronically activated locks maintain a current credential list, thereby improving the security of the premises.

Figure 4:
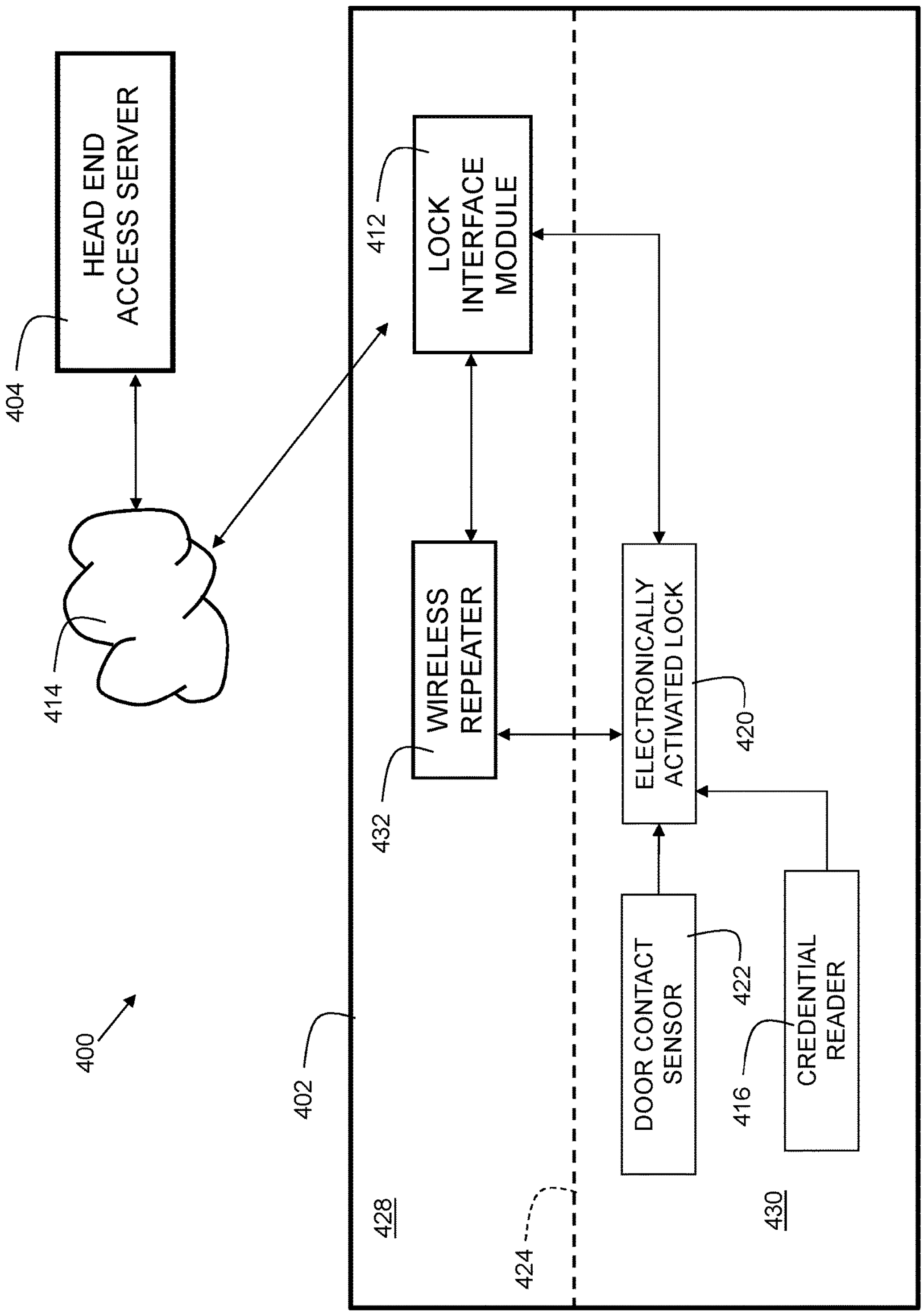
FIG. 4 is a block diagram of a system in accordance with alternative embodiments of the present invention.

FIG. 4 is a block diagram of a system 400 in accordance with alternative embodiments of the present invention. System 400 includes a head end access server 404, which is similar to server 104 of FIG. 1. Premises 402 may include a secure side 428, and an unsecure side 430, bounded by wall 424. On the unsecure side 430, a credential reader 416 and door contact sensor 422 are electronically interfaced to electronically activated lock 420. In some embodiments, the credential reader may be integrated as part of the lock assembly for the electronically activated lock 420. When a user wishes to pass from the unsecure side 430 to the secure side 428, the user may place a credential (e.g. an RFID enabled card) in proximity to the credential reader 416. The electronically activated lock 420 checks an internally stored credential list, and unlocks the entrance if the user's credential is found in the list. A door contact sensor 422 can be used to confirm that the entrance (e.g. door) is opened, allowing the user to enter, and then confirm that the door closes. Once the door closes, as detected by door contact sensor 422, the lock 420 is activated again, and the entrance is locked.

In this embodiment, the lock interface module 412 may be installed at a distance that exceeds the range of the short range communication interface of the electronically activated lock. In this case, a wireless repeater 432 may be installed that is located between the electronically activated lock 420 and the lock interface module 412. In some embodiments, the short range communication may utilize WiFi and/or low power WiFi, in which case, a wireless repeater 432 can serve as a range extender so that the electronically activated lock 420 and the lock interface module 412 can communicate with each other. Such an embodiment may be well suited for a large premises such as a warehouse, airport, hotel, or other large venue. In embodiments that use Zigbee, a wireless repeater may be used to extend the distance over which the electronically activated lock 420 and the lock interface module 412 can communicate with each other. Any other short range protocol that can be used with repeaters/range extenders can be used in these embodiments. The lock interface module 412 can communicate with the head end access server 404 via network 414. In embodiments, network 414 includes the Internet.

Figure 5:
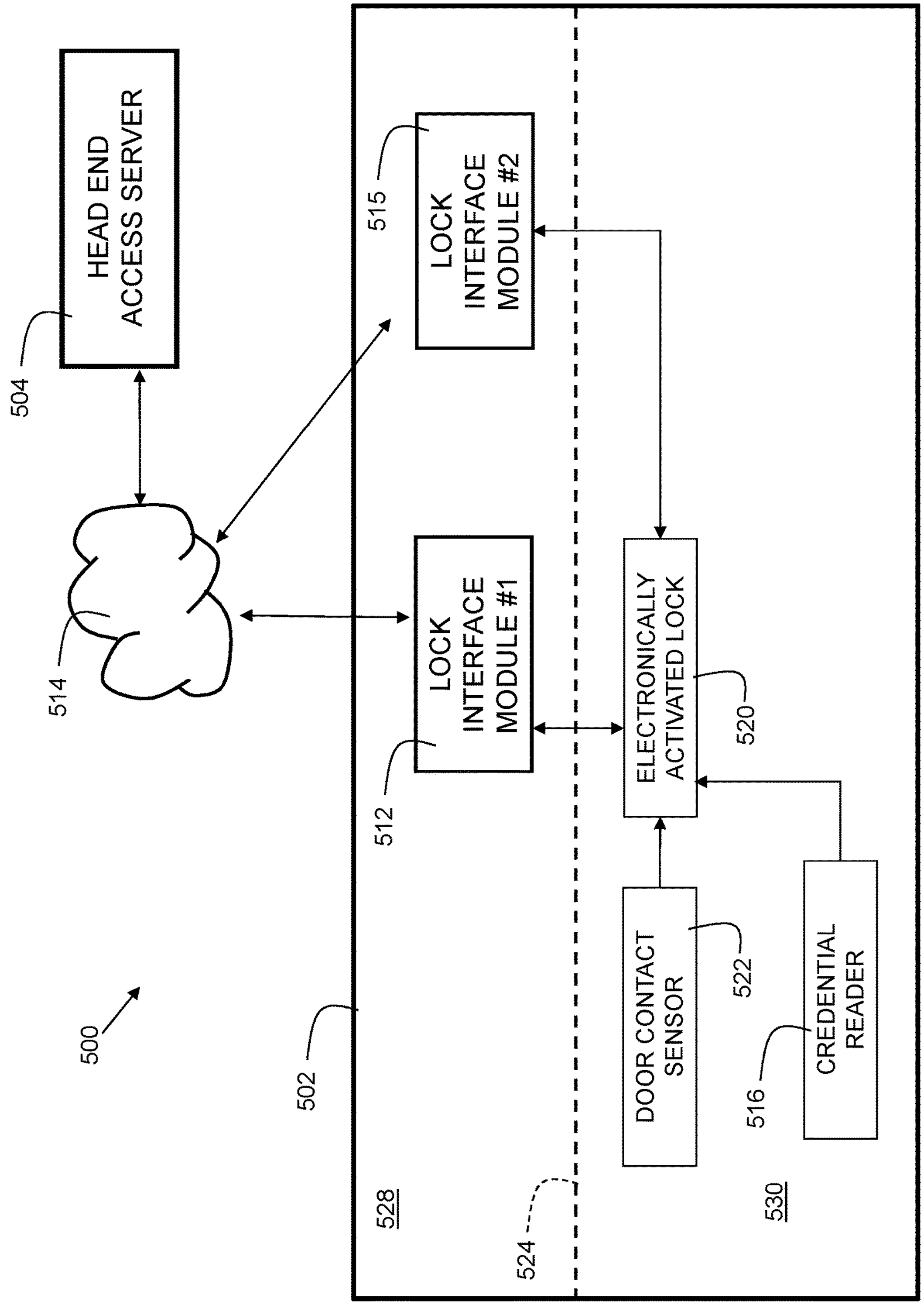
FIG. 5 is a block diagram of a system in accordance with another alternative embodiment of the present invention.

FIG. 5 is a block diagram of a system 500 in accordance with another alternative embodiment of the present invention. System 500 includes a head end access server 504, which is similar to server 104 of FIG. 1. Premises 502 may include a secure side 528, and an unsecure side 530, bounded by wall 524. On the unsecure side 530, a credential reader 516 and door contact sensor 522 are electronically interfaced to electronically activated lock 520. When a user wishes to pass from the unsecure side 530 to the secure side 528, the user may place a credential (e.g. an RFID enabled card) in proximity to the credential reader 516. The electronically activated lock 520 checks an internally stored credential list, and unlocks the entrance if the user's credential is found in the list. A door contact sensor 522 can be used to confirm that the entrance (e.g. door) is opened, allowing the user to enter, and then confirm that the door closes. Once the door closes, as detected by door contact sensor 522, the lock 520 is activated again, and the entrance is locked.

In this embodiment the electronically activated lock 520 is in communication with two lock interface modules, indicated as 512 and 515. Both lock interface modules can communicate a new credential list to the electronically activated lock 520. In embodiments, the electronically activated lock is programmed such that it processes one or more deletions in its stored credential list if the credential list is received from at least one of the first lock interface module or the second lock interface module. In this way, there is redundancy in propagating a deleted user to the electronically activated lock 520. If one of the lock interface modules (512, 515) is offline or otherwise unreachable, the other lock interface module can relay the deletion to the electronically activated lock. Similarly, in embodiments, the electronically activated lock is programmed such that it processes one or more additions in its stored credential list if the credential list is received from at least one of the first lock interface module or the second lock interface module. In this way, there is redundancy in propagating a newly added user to the electronically activated lock 520. If one of the lock interface modules (512, 515) is offline or otherwise unreachable, the other lock interface module can relay the new user to the electronically activated lock. Lock interface module 512 and lock interface module 515 can communicate with the head end access server 504 via network 514. In embodiments, network 514 includes the Internet.

In some embodiments, the electronically activated lock is programmed such that it processes one or more additions in its stored credential list if the credential list is received from both the first lock interface module and the second lock interface module. In this way, there is improved security in terms of adding users. In these embodiments, the electronically activated lock 520 only accepts a new user if it receives a credential list from both lock interface module 512 and lock interface module 515. In this way, if a malicious actor tries to add a user by spoofing a single lock interface module, the user is not added. Thus, this scheme considerably hampers the ability of a malicious actor to add an unauthorized user to the credentials list. In embodiments, the first set of credential information and the second set of credential information are identical.

Similarly, in some embodiments, the electronically activated lock is programmed such that it processes one or more deletions in its stored credential list if the credential list is received from both the first lock interface module and the second lock interface module. In this way, there is improved security in terms of removing users. In these embodiments, the electronically activated lock 520 only deletes a user if it receives a credential list from both lock interface module 512 and lock interface module 515. In this way, if a malicious actor tries to remove a user by spoofing a single lock interface module, the user is not removed. Thus, this scheme considerably hampers the ability of a malicious actor to remove a user to the credentials list (e.g. as part of a denial of service attack).

Thus, in embodiments, the electronically activated lock comprises a processor, a memory coupled to the processor, a locking mechanism, where the memory contains instructions, that when executed by the processor, perform the steps of processing one or more deletions in the credential list if the credential list is received from the lock interface module. In some embodiments, the electronically activated lock comprises a processor, a memory coupled to the processor, a locking mechanism, where the memory contains instructions, that when executed by the processor, perform the steps of processing one or more additions in the credential list if the credential list is received from the lock interface module. Note that while two lock interface modules are shown in FIG. 5, in practice, there can be more than two lock interface modules that are associated with a given electronically activated lock.

Figure 6:
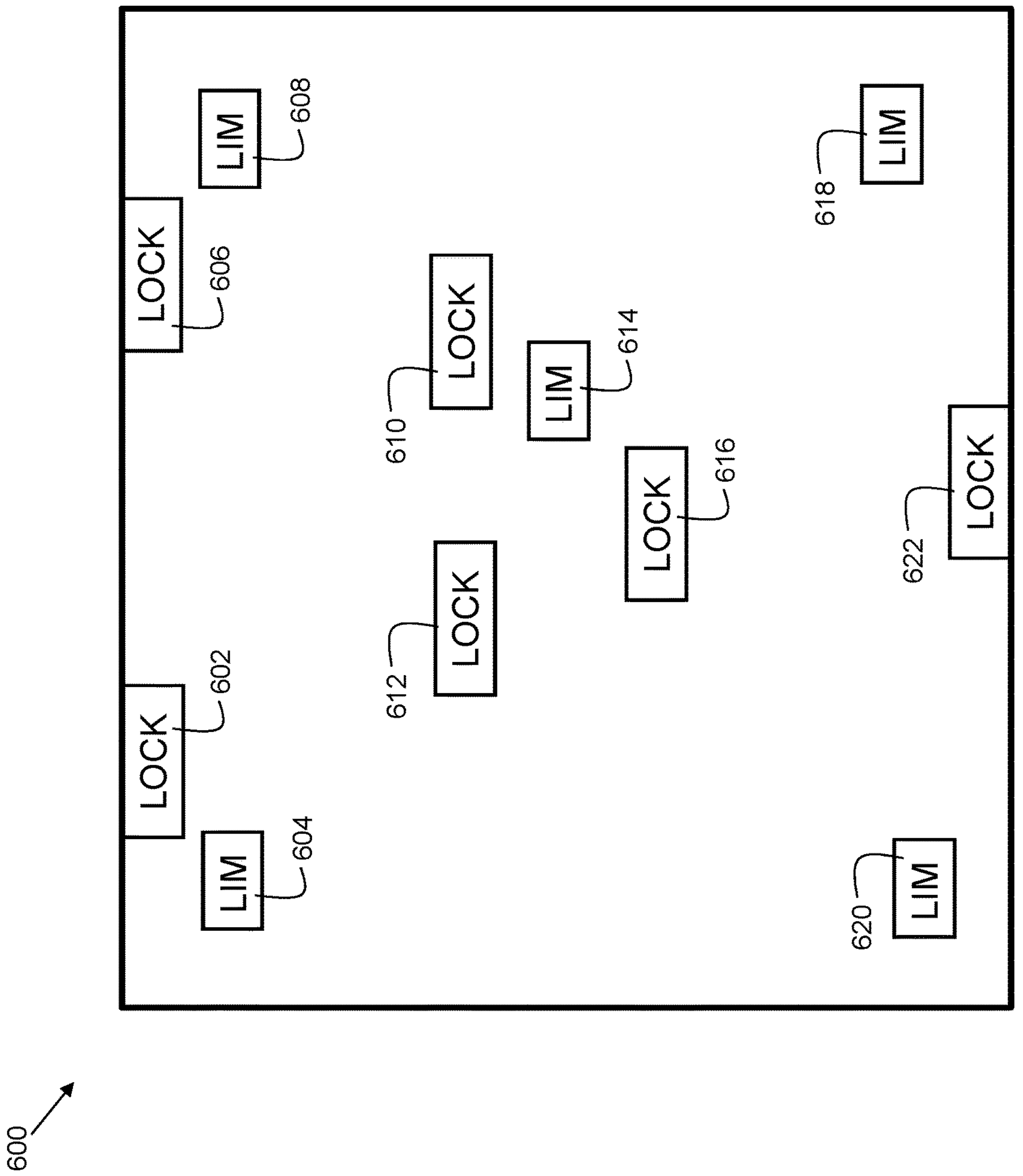
FIG. 6 shows an exemplary premises with embodiments of the present invention.

FIG. 6 shows an exemplary premises 600 with embodiments of the present invention. As shown, there are a plurality of lock interface modules, indicated as 604, 608, 614, 618, and 620. There are a plurality of electronically activated locks, indicated as 602, 606, 610, 612, 616, and 622. As previously described, in some embodiments, there may be a one-to-one relationship between a lock interface module and an electronically activated lock. For example, lock interface module 604 communicates with lock 602, and lock interface module 608 communicates with lock 606. In some embodiments, a lock interface module may communicate with multiple electronically activated locks. For example, lock interface module 614 communicates with lock 610, 612, and 616. In some embodiments, multiple lock interface modules may communicate with a single electronically activated lock. For example, electronically activated lock 622 communicates with both lock interface module 620 and lock interface module 618. This arrangement can provide the redundancy and enhanced security as shown in FIG. 5.

Figure 7:
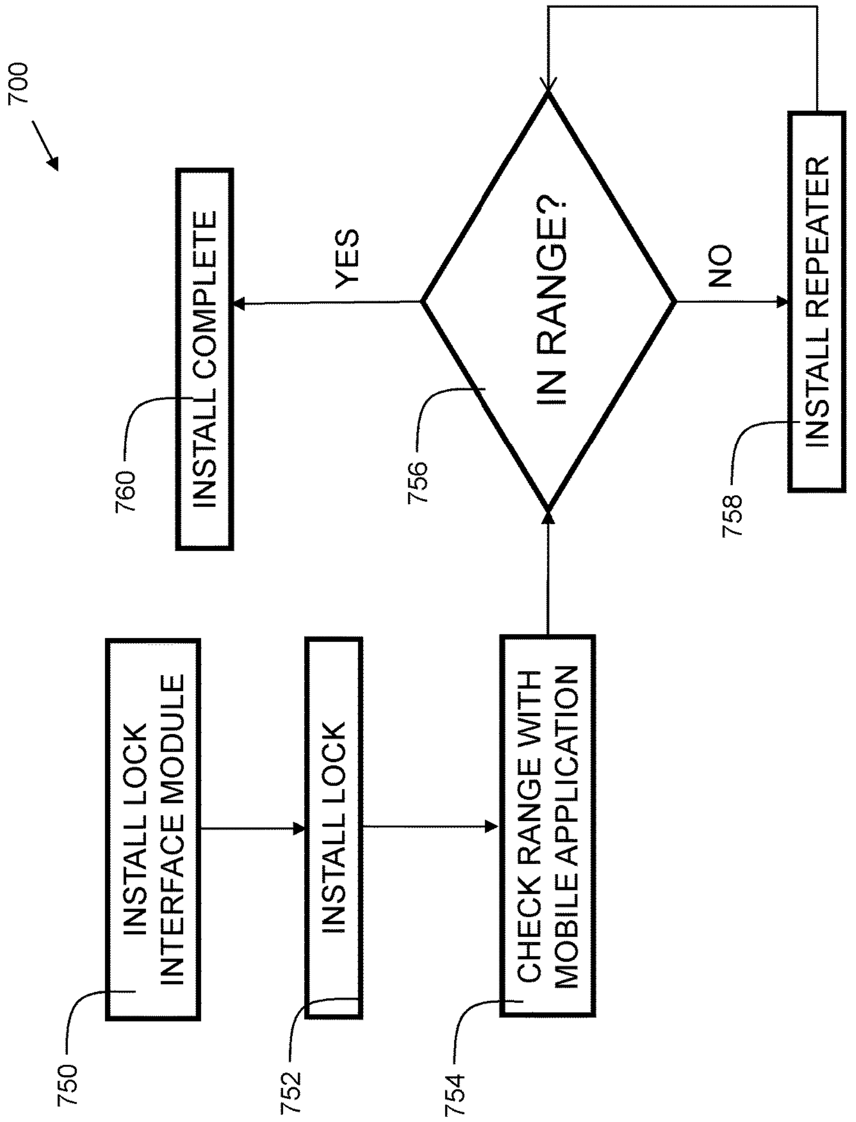
FIG. 7 is a flowchart indicating an installation process in accordance with embodiments of the present invention.

FIG. 7 is a flowchart 700 indicating an installation process in accordance with embodiments of the present invention. At step 750, a lock interface module (such as indicated as 200 in FIG. 2) is installed in a premises. At step 752, an electronically activated lock (such as indicated as 300 in FIG. 3) is installed in a premises. At step 754, a check may be made with a mobile application. For example, an installer may have an application installed on a mobile device such as a mobile phone or a tablet computer. The mobile device is equipped with the short range communication transceivers in use for the system. This could include, but is not limited to, Bluetooth, Bluetooth Low Energy, WiFi, and/or Zigbee. Thus, in some embodiments, the lock interface module and the electronically activated lock each include a Bluetooth Low Energy transceiver. In some embodiments, the lock interface module and the electronically activated lock each include a Zigbee transceiver. In some embodiments, the lock interface module and the electronically activated lock each include a WiFi transceiver.

The mobile device can be used to determine if both the lock interface module and the electronically activated lock are in range of each other. In embodiments, the lock interface module and the electronically activated lock are each programmed to periodically send out a handshake signal. For example, in embodiments, the handshake signal may be sent every ten seconds. The mobile device can be programmed to receive this handshake signal. The installer then can perform a range check at step 756 by standing near the electronically activated lock and checking the mobile device to determine if the lock interface module handshake is received at that location. If yes, then the installation completes at step 760. If no, then the installer installs a repeater 758 at an intermediate location between the electronically activated lock and the lock interface module (see FIG. 4). The process repeats, with installation of additional repeaters as necessary until the lock interface module can communicate with the electronically activated lock.

Figure 8:
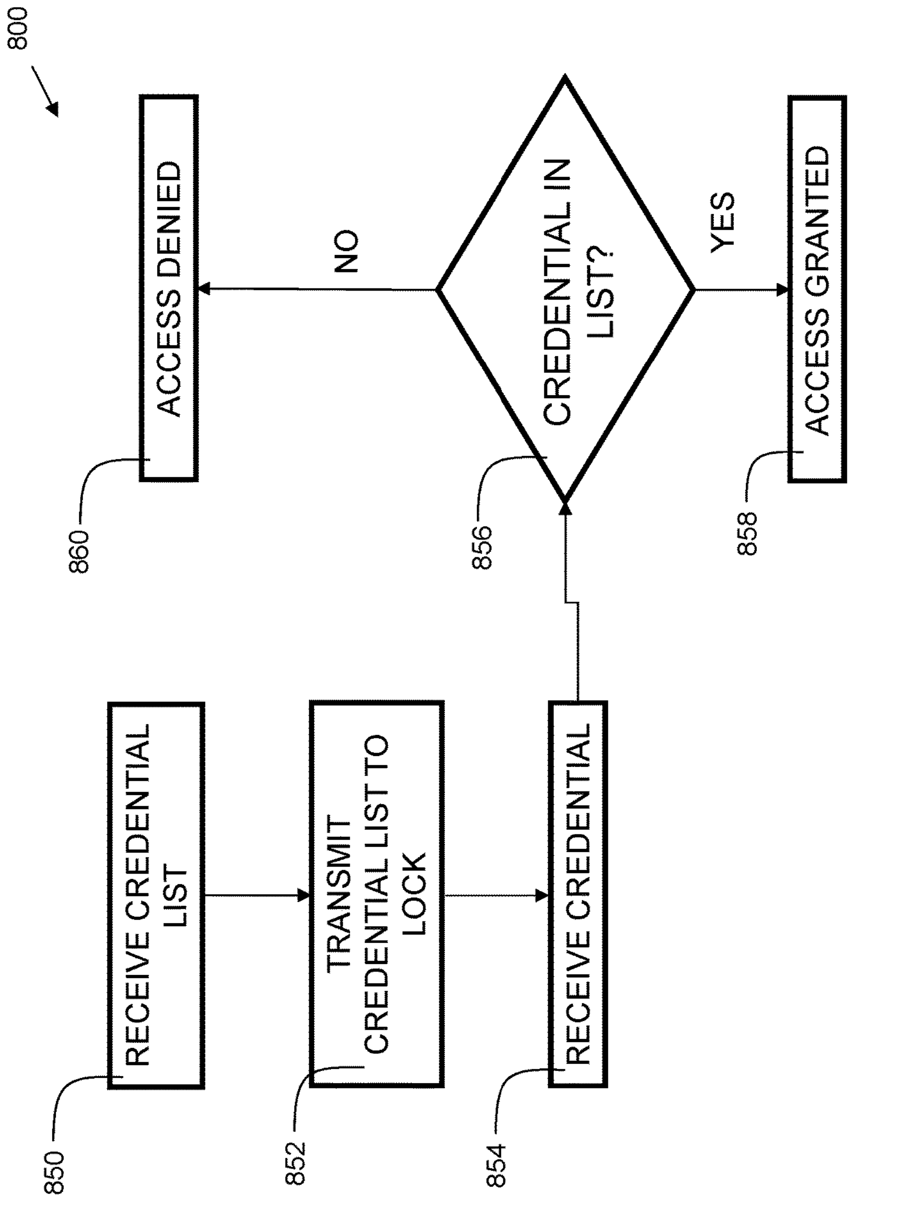
FIG. 8 is a flowchart indicating process steps in accordance with embodiments of the present invention.

FIG. 8 is a flowchart 800 indicating process steps in accordance with embodiments of the present invention. In process step 850, a credential list is received. This may include a lock interface module receiving a credential list from a head end access server. In process step 852, the credential list is transmitted from the lock interface module to an electronically activated lock. In process step 854, a credential is received (e.g. from a user presenting an RFID enabled badge in proximity to a badge reader). In process step 856 a check is made to determine if the credential is in the internally stored credential list of the electronically activated lock. If yes, then access is granted in step 858 and the electronically activated lock unlocks the door. If no, then access is denied in step 860 and the electronically activated lock remains locked. In some embodiments, the electronically activated lock may transmit a message to the lock interface module indicating the denial of entry. The lock interface module can then transmit a similar message to the head end access server. The head end access server can then alert security personnel via e-mail, text message, automated telephone call, or other technique, regarding the attempted access.

In some embodiments, an association is established between a lock interface module and an electronically activated lock as part of an installation process. Both the lock interface module and the electronically activated lock may implement a "learn" mode, where data can be exchanged between the two devices. The data may include a serial number, device address, certificate, or other digital data that can be used to authenticate the devices to each other. In embodiments, the authentication data shared between each lock interface module and each electronically activated device may be encoded with check digits to improve security. In embodiments, an ISO 7064 Mod 97-10 scheme may be used to encode device serial numbers, adding another level of complication for malicious actors attempting to spoof a device. For example, the table below lists exemplary 8 digit codes that can be used:

| Authentication Codes |
|---|
| 87654342 |
| 98070202 |
| 98356158 |
| 88876348 |
| 98736495 |
| 65430090 |
| 77654321 |
| 66384861 |

Each of the codes above complies with the ISO 7064 Mod 97-10 scheme, in that each code results in a value of 1 when a MOD-97 operation is performed. These codes are merely exemplary. In practice, other check digit schemes, hash schemes, and/or checksum schemes may be used to generate valid authentication codes.

In embodiments, attempts to authenticate with numbers that do not adhere to the encoding scheme are rejected, thereby reducing the risk of an authentication with a compromised device. Additionally, embodiments, during initialization, may exchange rolling code data. The rolling code data can include a set of codes, and/or a seed for a pseudorandom number generator, such that each device can generate a matching set of codes. In such embodiments, each electronically activated lock may periodically transmit a code from the rolling code set. The lock interface module receives this code, and confirms if it is the next code in the rolling code set. In embodiments, lock interface module may implement a window of acceptance for the rolling codes, in case an electronically activated lock goes offline temporarily. If the rolling code is outside of the acceptance window, the lock interface module may send an empty credential list to that electronically activated lock, causing all the users to be deleted from the credential list of the electronically activated lock, essentially preventing all access at that entrance. The lock interface module may then send a message to the head end access system alerting security administrators to the situation of a potentially compromised electronically activated lock.

Figure 9:
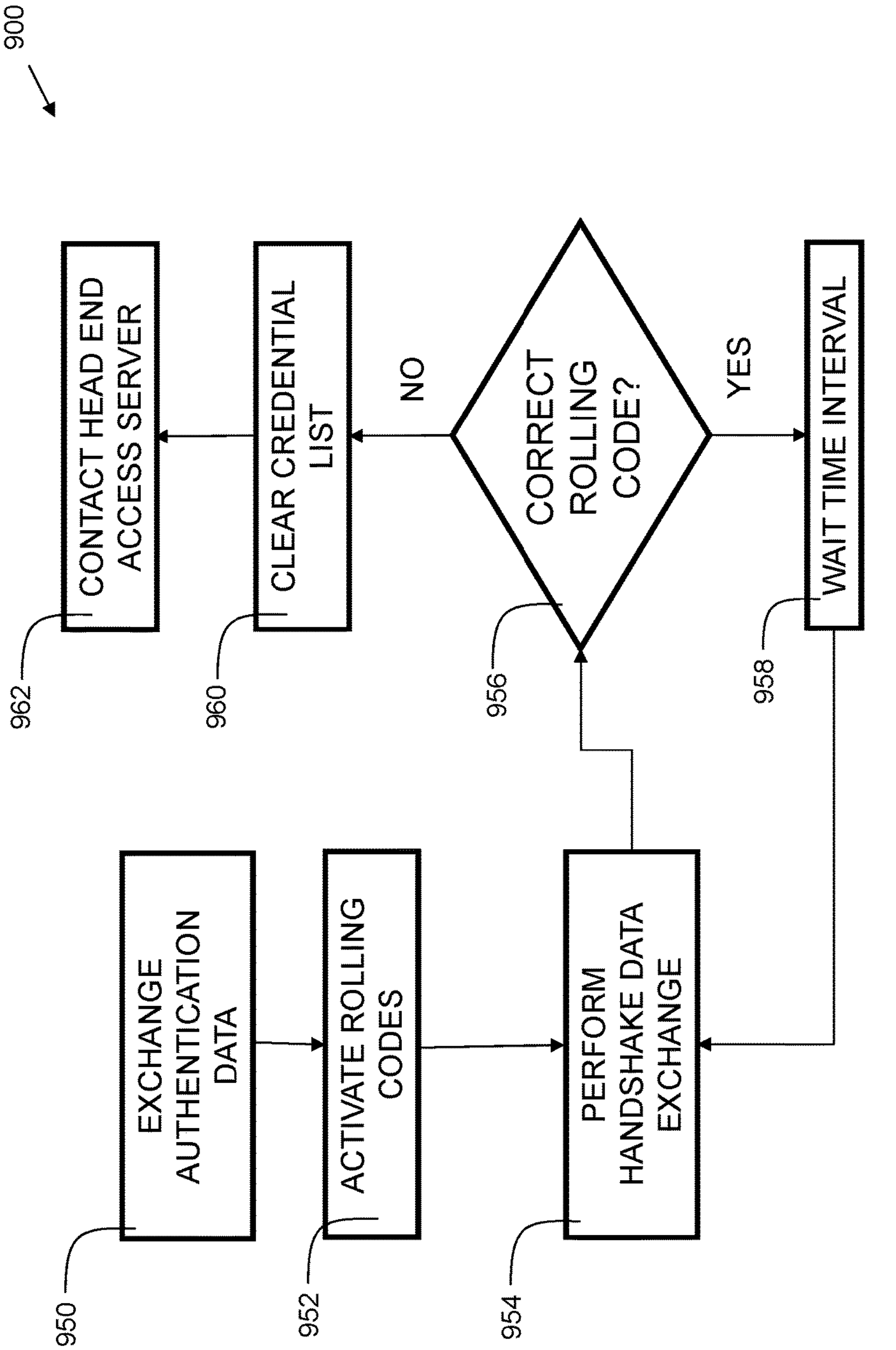
FIG. 9 is a flowchart indicating a system security protocol in accordance with embodiments of the present invention.

FIG. 9 is a flowchart 900 indicating a system security protocol in accordance with embodiments of the present invention. In process step 950, authentication data is exchanged. This can include the exchange of ISO 7064 Mod 97-10 numbers or other suitably generated numbers. This may take place as part of an initial setup/installation process. In process step 952, rolling codes are activated between each electronically activated lock and its associated lock interface module(s). This may include exchanging a set of codes, and/or a seed for a pseudorandom number generator, such that each device can generate a matching set of codes. In process step 954, a handshake data exchange occurs. This may include an electronically activated lock sending a rolling code from the rolling code set to a lock interface module, and/or the lock interface module sending a rolling code from the rolling code set to an electronically activated lock. Thus, embodiments include performing a periodic handshake data exchange between the lock interface module and the associated electronically activated lock. In embodiments, the periodic handshake data exchange includes a rolling code. In process step 956, the lock interface module performs a check of the rolling code. This may include confirming that the received code is the proper code in the sequence of rolling codes. If the code is correct, or within an established window, then the process proceeds to step 958, where a time interval (delay) occurs, before the next handshake data exchange occurs. In embodiments, the time interval may range from five seconds to sixty seconds. Other delays are possible. If, at 956, the rolling code received by the lock interface module is deemed to be incorrect, then a system security protocol is initiated. The system security protocol can include clearing the credential list 960 for the electronically activated lock. This can be accomplished by sending an empty credential list, effectively removing all users. The lock interface module may then send a message to the head end access server at process step 962. The head end access module can then alert security personnel of the situation so it can be investigated.

In yet other embodiments, the lock interface module may send a message to the head end access server indicating a low battery condition of the lock interface module and/or an associated electronically activated lock. The head end access module can then alert security personnel of the low battery condition so it can be addressed. Additionally, the head end access module may perform a periodic transmitting of the credential list in response to receiving the low battery condition. In this way, in the event any information is lost during the battery replacement, it is quickly replenished so the electronically activated lock is back online and operating properly as soon as possible.

As can now be appreciated, in embodiments of the present invention, by using techniques such as the authentication data and rolling codes, the risk of security breaches due to compromised devices is reduced. Furthermore, embodiments provide techniques that enable easy installation of locks that have credential lists that stay synchronized to the head end access server, reducing the risk of a newly unauthorized person gaining access to a premises. Thus, the overall security of a premises can be increased using embodiments of the present invention.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. An access control system comprising:

a first lock interface module configured and disposed to receive electronic data from an access management computer via a computer network;

a second lock interface module configured and disposed to receive electronic data from the access management computer via a computer network; and an electronically activated lock adapted to redundantly receive short-range communication via a short range wireless communications channel from both the first lock interface module and the second lock interface module;

a credential reader configured and disposed to read a credential from a user;

wherein the first lock interface module is configured and disposed to transmit a first set of updated credential information to the electronically activated lock, and wherein the second lock interface module is configured and disposed to transmit a second set of updated credential information to the electronically activated lock such that credential information for the user can be added when the first set of credential information and second set of credential information is received by the electronically activated lock.

2. The access control system of claim 1, wherein the first lock interface module, the second lock interface module, and the electronically activated lock each include a Bluetooth™ Low Energy transceiver.

3. The access control system of claim 1, wherein the first lock interface module, the second lock interface module, and the electronically activated lock each include a Zigbee transceiver.

4. The access control system of claim 1, wherein the first lock interface module, the second lock interface module, and the electronically activated lock each include a WiFi transceiver.

5. The access control system of claim 1, wherein the first set of credential information and the second set of credential information are identical.

6. A method for access control, comprising:

receiving a credential list into a first lock interface module via a computer network;

transmitting the credential list to an associated electronically activated lock from the first lock interface module via a first short range wireless communications channel;

receiving a credential from an associated credential reader configured and disposed to read a credential from a user;

redundantly receiving the credential list into a second lock interface module via the computer network;

transmitting the credential list to the associated electronically activated lock from the second lock interface module via a second short range wireless communications channel;

processing one or more deletions in the credential list when the credential list is received from at least one of the first lock interface module or the second lock interface module; and preventing access of the user if the credential is not in the credential list.

7. The method of claim 6, wherein transmitting the credential list comprises transmitting the credential list using a Bluetooth™ Low Energy transceiver.

8. The method of claim 6, wherein transmitting the credential list comprises transmitting the credential list using a Zigbee transceiver.

9. The method of claim 6, wherein transmitting the credential list comprises transmitting the credential list using a WiFi transceiver.

10. The method of claim 6, further comprising:

processing one or more additions in the credential list when the credential list is received from both the first lock interface module and the second lock interface module.

11. The method of claim 6, further comprising:

processing one or more deletions in the credential list when the credential list is received from both the first lock interface module and the second lock interface module.

12. The method of claim 6, further comprising:

processing one or more additions in the credential list when the credential list is received from at least one of the first lock interface module or the second lock interface module.

13. The method of claim 6, further comprising performing a periodic handshake data exchange between the first lock interface module and the associated electronically activated lock.

14. The method of claim 13, wherein the periodic handshake data exchange includes a rolling code.

* * * * *